US009013866B2

(12) United States Patent
Yu et al.

(10) Patent No.: US 9,013,866 B2
(45) Date of Patent: Apr. 21, 2015

(54) DRIVING MECHANISM FOR DRIVING DISPLAY MODULE TO MOVE RELATIVE TO HOST MODULE AND PORTABLE ELECTRONIC DEVICE THEREWITH

(71) Applicant: Wistron Corporation, New Taipei (TW)

(72) Inventors: Lee-Hua Yu, New Taipei (TW); Hua-Chung Tseng, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 103 days.

(21) Appl. No.: 13/862,453

(22) Filed: Apr. 14, 2013

(65) Prior Publication Data

US 2013/0335895 A1 Dec. 19, 2013

(30) Foreign Application Priority Data

Jun. 19, 2012 (TW) .............................. 101211804 U (51) Int. Cl.
*G06F 1/16* (2006.01)
(52) U.S. Cl.
CPC ............ *G06F 1/1637* (2013.01); *G06F 1/1613* (2013.01); *Y10T 403/32606* (2015.01); *G06F 1/1626* (2013.01); *G06F 1/1632* (2013.01); *G06F 1/1669* (2013.01); *G06F 1/1681* (2013.01)
(58) Field of Classification Search
CPC ..................................... G06F 1/16; G06F 1/20
USPC .............................. 361/670–753, 679.2–679.3
See application file for complete search history.

(56) References Cited

U.S. PATENT DOCUMENTS

| | | | |
|---|---|---|---|
| 6,781,819 B2 * | 8/2004 | Yang et al. ............... | 361/679.09 |
| 6,947,279 B2 * | 9/2005 | Cheng et al. ............. | 361/679.06 |
| 7,298,610 B2 * | 11/2007 | Kim et al. ................. | 361/679.55 |
| 7,574,241 B2 * | 8/2009 | Ahn et al. .................. | 455/575.1 |
| 7,611,113 B2 * | 11/2009 | Lai .............................. | 248/286.1 |
| 2006/0133020 A1 * | 6/2006 | Huang et al. .................. | 361/683 |
| 2007/0217135 A1 * | 9/2007 | Chuang et al. ................ | 361/681 |
| 2009/0021896 A1 * | 1/2009 | Kim .............................. | 361/679 |

* cited by examiner

*Primary Examiner* — Tuan T Dinh
*Assistant Examiner* — Rockshana Chowdhury
(74) *Attorney, Agent, or Firm* — Winston Hsu; Scott Margo (57) ABSTRACT

A driving mechanism for driving a display module to move relative to a host module includes a display module fixing component disposed in the display module, a host module fixing component movably disposed in the host module, and a pivoting component. An end of the pivoting component is pivotally connected to the display module fixing component and another end of the pivoting component is fixed to the host module fixing component. The pivoting component drives the host module fixing component to move as being pivoted by the display module fixing component. The driving mechanism further includes at least one protruding structure disposed on the host module fixing component and capable of moving relative to an inner side of the host module in line contact manner or point contact manner as the pivoting component drives the host module fixing component to move.

11 Claims, 9 Drawing Sheets

DRIVING MECHANISM FOR DRIVING DISPLAY MODULE TO MOVE RELATIVE TO HOST MODULE AND PORTABLE ELECTRONIC DEVICE THEREWITH

BACKGROUND OF THE INVENTION

1. Field of the Invention

The invention relates to a driving mechanism for driving a display module to move relative to a host module and a portable electronic device therewith and, more particularly, to a driving mechanism utilizing a protruding structure to guide a display module to slide relative to a host module in line contact manner or point contact manner and a portable electronic device therewith.

2. Description of the Prior Art

A conventional flat computer utilizes a touch panel to input control commands. However, the operation of the touch panel is inconvenient under some conditions, so a portable computer device equipped with a notebook host device, which has a keyboard, and a touch panel has been developed. Traditionally, the touch panel is supported by a computer host device with a hinge, which can pivot relative to the host device and drive the touch panel to slide relative to the host device. However, the aforesaid hinge usually cannot drive the touch panel to slide relative to the host device smoothly. For example, the hinge may not work easily due to larger friction, may be abraded after a span of time, and may sway due to smaller friction, such that the stability is worse. Therefore, how to design a driving mechanism with strong structure for opening the touch panel easily and stably becomes a significant issue when manufacturing electronic devices.

SUMMARY OF THE INVENTION

The invention provides a driving mechanism utilizing a protruding structure to guide a display module to slide relative to a host module in line contact manner or point contact manner and a portable electronic device therewith, so as to solve the aforesaid problems.

According to the claimed invention, a driving mechanism for driving a display module to move relative to a host module comprises a display module fixing component, a host module fixing component, a pivoting component and at least one protruding structure. The display module fixing component is disposed in the display module; the host module fixing component is movably disposed in the host module; an end of the pivoting component is pivotally connected to the display module fixing component and another end of the pivoting component is fixed to the host module fixing component, the pivoting component drives the host module fixing component to move as being pivoted by the display module fixing component; and the at least one protruding structure is disposed on the host module fixing component and capable of moving relative to an inner side of the host module in line contact manner or point contact manner as the pivoting component drives the host module fixing component to move, so as to guide the host module fixing component to move relative to the host module.

According to the claimed invention, the at least one protruding structure is a roller or a ball bearing capable of rolling relative to the inner side of the host module in line contact manner.

According to the claimed invention, the at least one protruding structure is a protruding bar capable of moving relative to the inner side of the host module in line contact manner.

According to the claimed invention, the at least one protruding structure is a protruding block capable of moving relative to the inner side of the host module in point contact manner.

According to the claimed invention, the driving mechanism further comprises a fastening component passing through the host module fixing component and being fastened on the pivoting component, so as to fasten the host module fixing component to the pivoting component.

According to the claimed invention, a portable electronic device comprises a host module, a display module and a driving mechanism. The display module is slidably disposed on a side of the host module; and the driving mechanism is connected with the host module and the display module and used for driving the display module to slide and rotate relative to the host module. The driving mechanism comprises a display module fixing component, a host module fixing component, a pivoting component and at least one protruding structure. The display module fixing component is disposed in the display module; the host module fixing component is movably disposed in the host module; an end of the pivoting component is pivotally connected to the display module fixing component and another end of the pivoting component is fixed to the host module fixing component, the pivoting component drives the host module fixing component to move as being pivoted by the display module fixing component; and the at least one protruding structure is disposed on the host module fixing component and capable of moving relative to an inner side of the host module in line contact manner or point contact manner as the pivoting component drives the host module fixing component to move, so as to guide the host module fixing component to move relative to the host module.

According to the claimed invention, a slot is formed on the host module and the pivoting component is movably disposed in the slot.

The protruding structure of the invention can move relative to the inner side of the host module in line contact manner or point contact manner, so as to guide the display module to slide relative to the host module. The driving mechanism of the invention not only can provide smooth and stable operation but also can avoid abrasion. Furthermore, the driving mechanism of the invention can avoid larger friction generated by the sliding structure of prior art. Accordingly, the structure of the invention has several advantages of practicability, heavy duty, smooth operation and stability.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
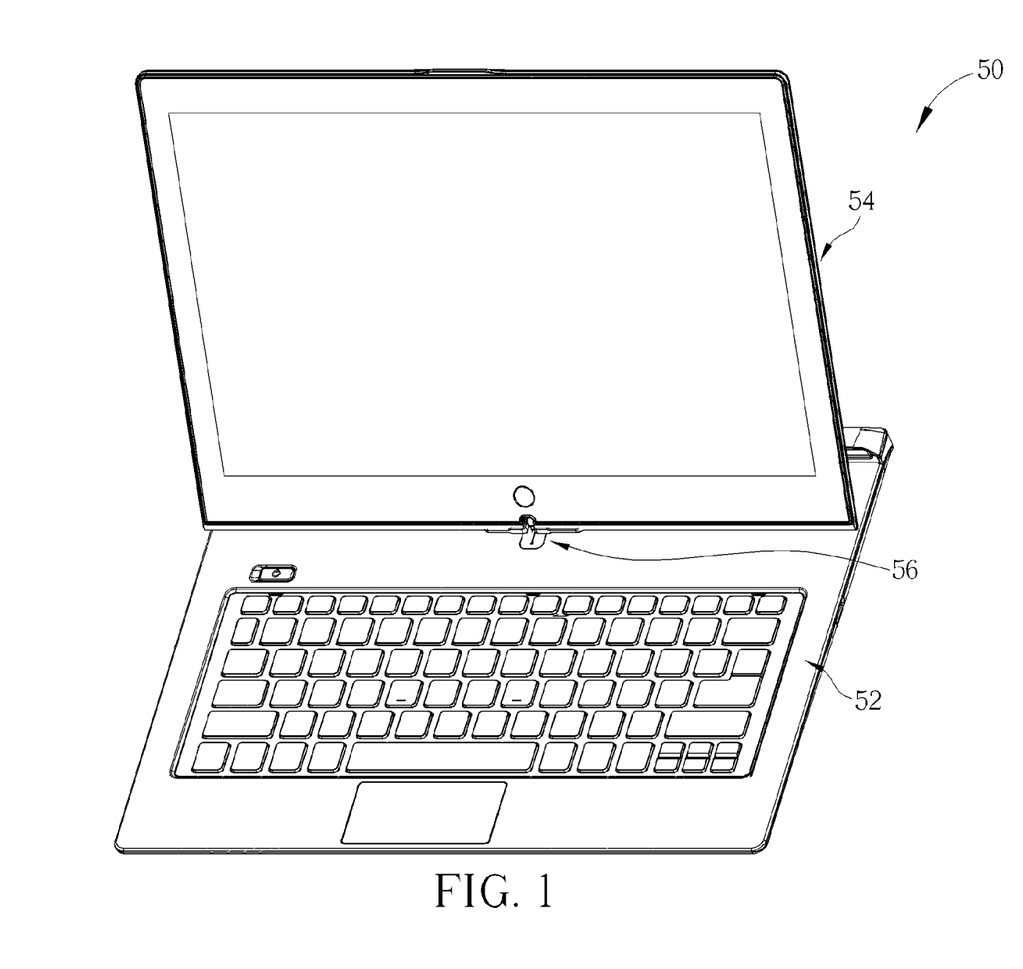
FIG. 1 is a perspective view illustrating a portable electronic device according to an embodiment of the invention.
Figure 2:
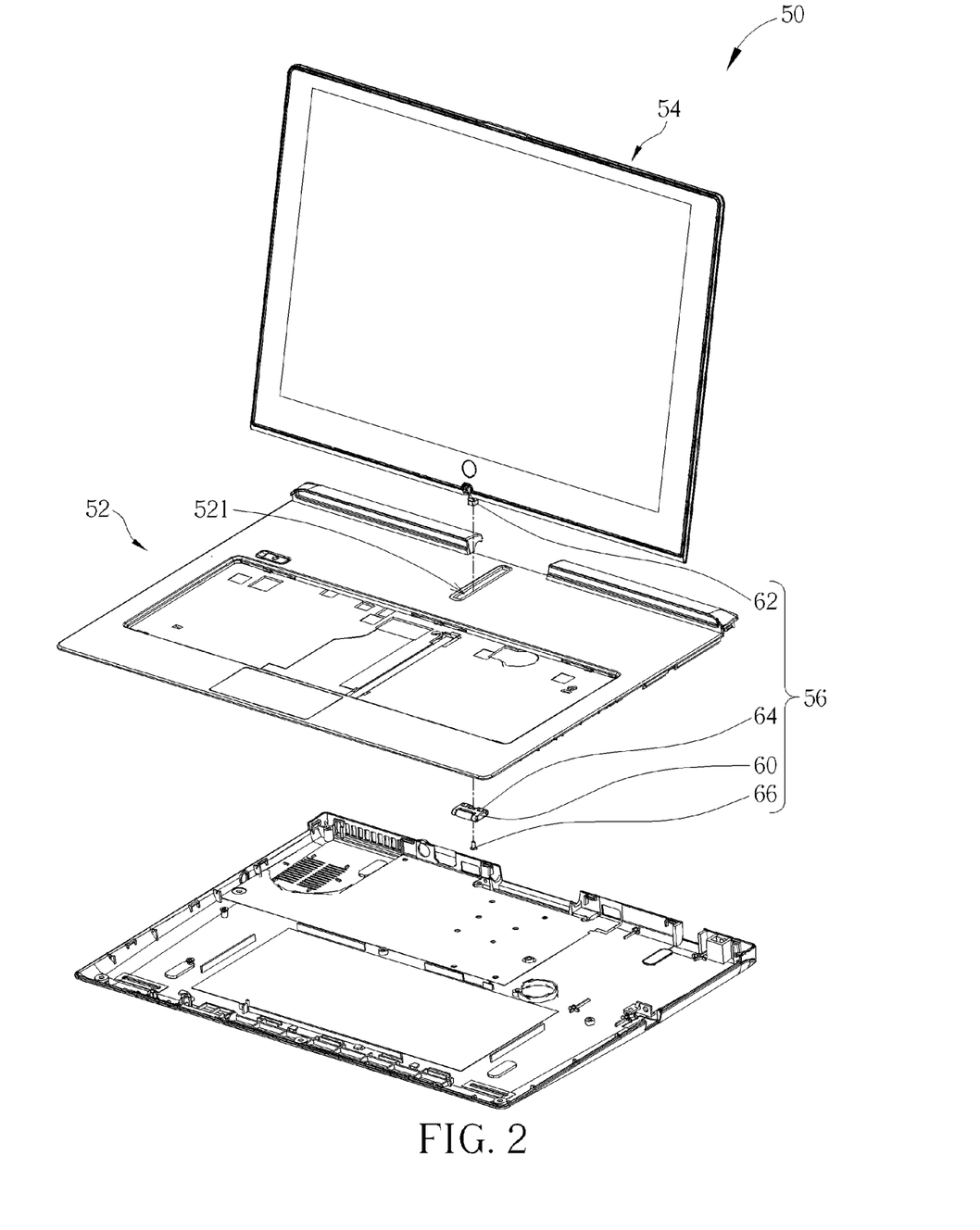
FIG. 2 is an exploded view illustrating the portable electronic device according to an embodiment of the invention.
Figure 3:
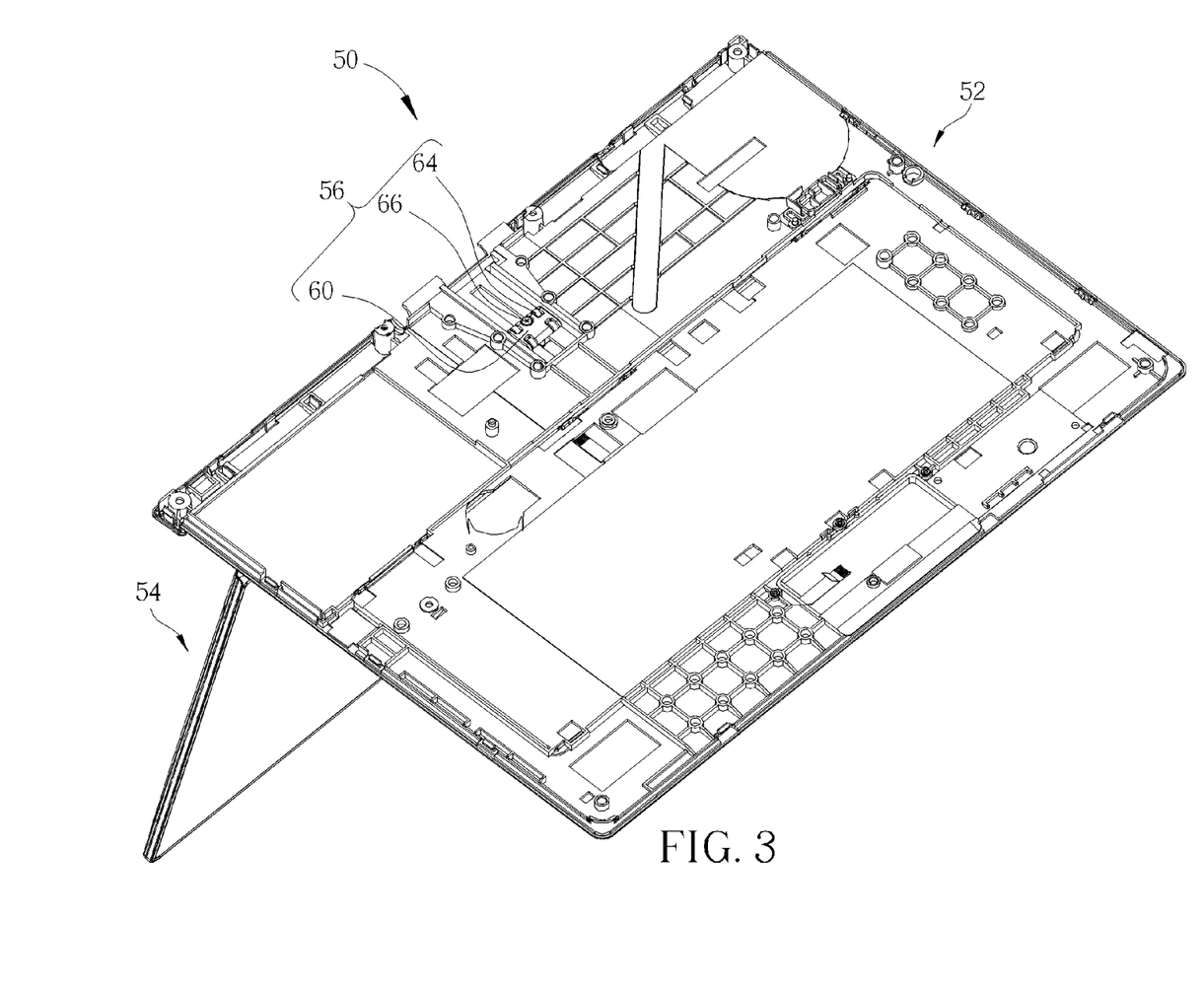
FIG. 3 is a bottom view illustrating the inner structure of the portable electronic device according to an embodiment of the invention.
Figure 4:
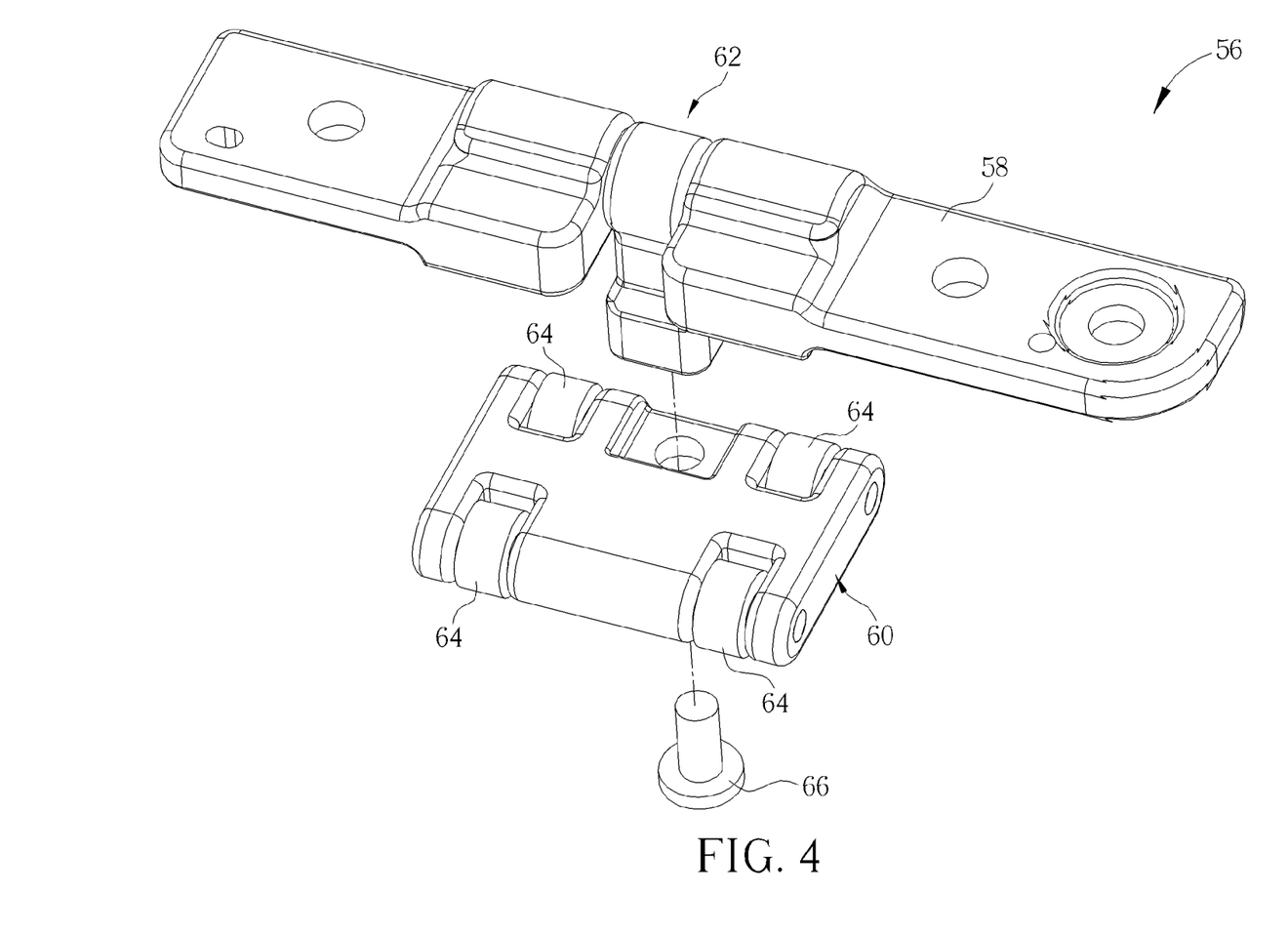
FIG. 4 is an exploded view illustrating the driving mechanism of the invention.
Figure 5:
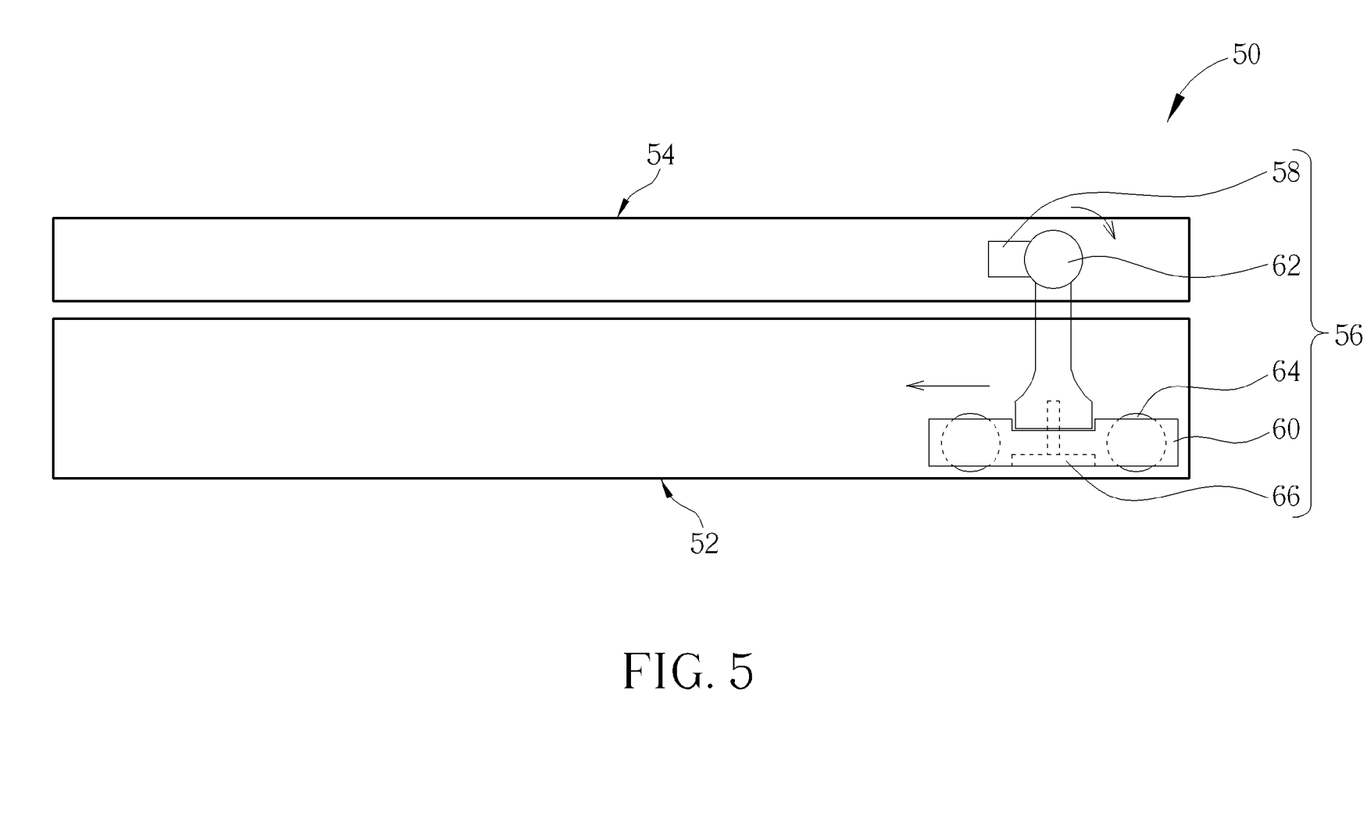
FIG. 5 is schematic diagram illustrating the operation of the driving mechanism according to an embodiment of the invention.

Referring to FIGS. 1 to 3, FIG. 1 is a perspective view illustrating a portable electronic device 50 according to an embodiment of the invention, FIG. 2 is an exploded view illustrating the portable electronic device 50 according to an embodiment of the invention, and FIG. 3 is a bottom view illustrating the inner structure of the portable electronic device 50 according to an embodiment of the invention. The portable electronic device 50 may be a portable computer device with two operation modes of notebook and flat computer. The portable electronic device 50 comprises a host module 52, which may be a computer host module and may be equipped with an input interface (e.g. keyboard, etc.), wherein a slot 521 is formed on the host module 52. The portable electronic device 50 further comprises a display module 54 slidably and rotatably disposed on a side of the host module 52. The display module 54 may be a touch display monitor such that a user can use the display module 54 to perform touch operation.

The portable electronic device 50 further comprises a driving mechanism 56 connected with the host module 52 and the display module 54 and used for driving the display module 54 to slide and rotate relative to the host module 52. Referring to FIGS. 1 to 4, FIG. 4 is an exploded view illustrating the driving mechanism 56 of the invention. The driving mechanism 56 comprises a display module fixing component 58, a host module fixing component 60, a pivoting component 62, at least one protruding structure 64 and a fastening component 66. The display module fixing component 58 is disposed in the display module 54. The host module fixing component 60 is movably disposed in the host module 52. An end of the pivoting component 62 is pivotally connected to the display module fixing component 58 and another end of the pivoting component 62 is fixed to the host module fixing component 60. The pivoting component 62 is capable of driving the host module fixing component 60 to move as being pivoted by the display module fixing component 58. The pivoting component 62 is movably disposed in the slot 521 of the host module 52. The protruding structure 64 is disposed on the host module fixing component 60 and capable of moving relative to an inner side of the host module 52 in line contact manner or point contact manner as the pivoting component 62 drives the host module fixing component 60 to move, so as to guide the host module fixing component 60 to move relative to the host module 52. The driving mechanism 56 may comprise a plurality of protruding structures 64 disposed at the edges of the host module fixing component 60. The position and number of the protruding structures 64 are not limited to this embodiment and can be determined based on practical applications. The fastening component 66 passes through the host module fixing component 60 and is fastened on the pivoting component 62, so as to fasten the host module fixing component 60 to the pivoting component 62. The fastening component 66 may be a screw.

Referring to FIGS. 1 to 5, FIG. 5 is schematic diagram illustrating the operation of the driving mechanism 56 according to an embodiment of the invention. As mentioned in the above, the display module fixing component 58 is disposed in the display module 54, the host module fixing component 60 is movably disposed in the host module 52, an end of the pivoting component 62 is pivotally connected to the display module fixing component 58 and another end of the pivoting component 62 is fixed to the host module fixing component 60. Accordingly, when a user opens the display module 54 shown in FIG. 5 clockwise, the display module fixing component 58 will drive the pivoting component 62 to rotate such that the host module fixing component 60, which is connected to the pivoting component 62, will move within the slot 521 of the host module 52 in a direction indicated by the arrow, so as to drive the display module 54 to move inwardly relative to the host module 52. In other words, when the display module 54 rotates relative to the host module 52, the driving mechanism 56 will drive the display module 54 to move relative to the host module 52. On the other hand, when the user closes the display module 54 shown in FIG. 5 counterclockwise, the display module fixing component 58 will drive the pivoting component 62 to rotate such that the host module fixing component 60, which is connected to the pivoting component 62, will move within the slot 521 of the host module 52 in a reverse direction, so as to drive the display module 54 to move outwardly relative to the host module 52.

Figure 6:
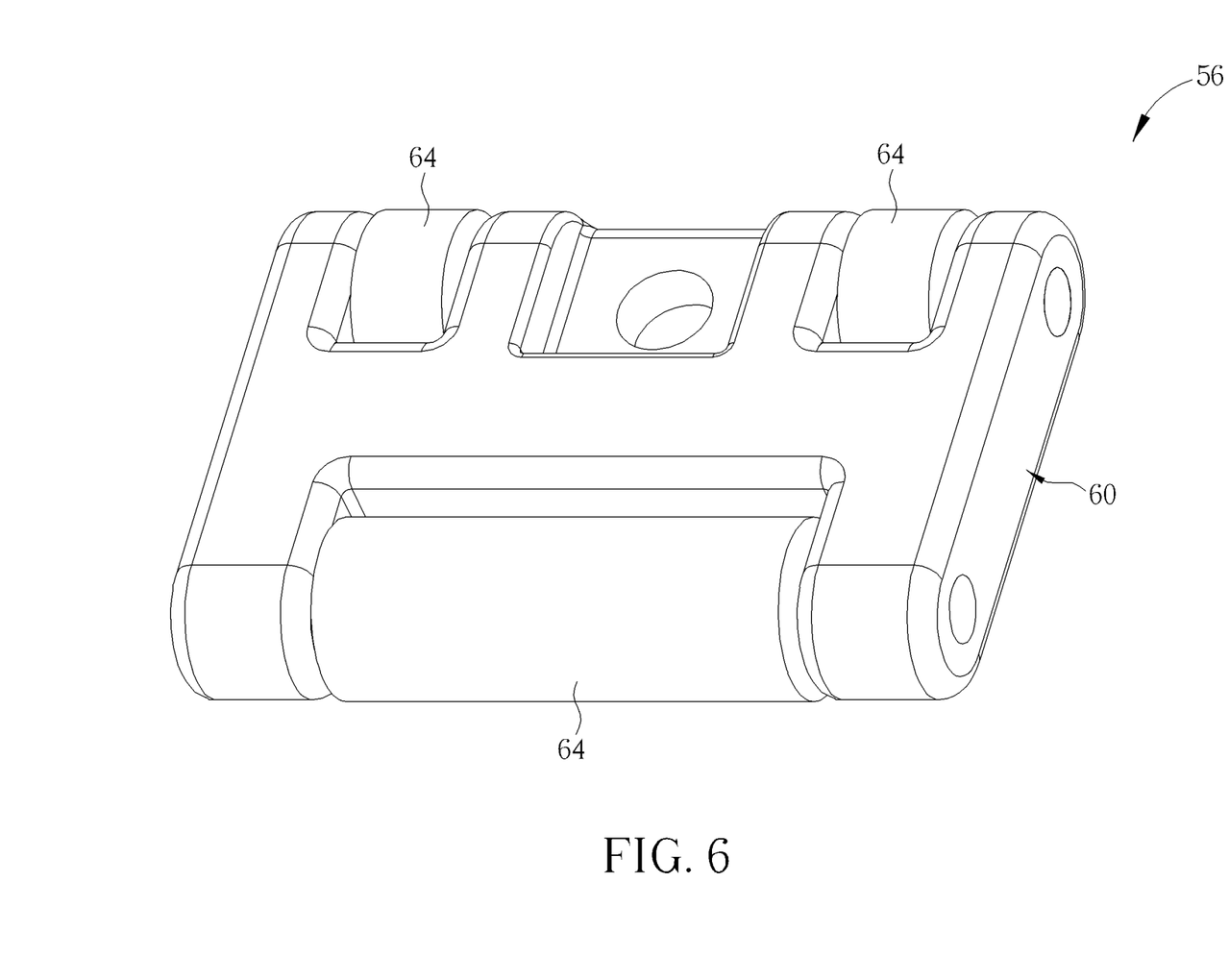
FIG. 6 is a schematic diagram illustrating parts of the driving mechanism according to another embodiment of the invention.

In this embodiment, the protruding structure 64 may be a roller or a ball bearing capable of rolling relative to the inner side of the host module 52 in line contact manner. The driving mechanism 56 comprises four protruding structures 64 disposed at opposite sides of the host module fixing component 60, so as to guide the host module fixing component 60 to move relative to the host module 52 stably. The position and number of the protruding structures 64 are not limited to the aforesaid embodiment. For example, referring to FIG. 6, FIG. 6 is a schematic diagram illustrating parts of the driving mechanism 56 according to another embodiment of the invention. In this embodiment, the driving mechanism 56 comprises three protruding structures 64, wherein two shorter protruding structures 64 are disposed at one side of the host module fixing component 60 and one longer protruding structure 64 is disposed at another side of the host module fixing component 60. The three protruding structures 64 can also guide the host module fixing component 60 to move relative to the host module 52 stably. The arrangement of the protruding structures 64 on the host module fixing component 60 can be determined based on practical applications. Since the host module fixing component 60 moves within the host module 52 in line contact manner through rolling of the protruding structures 64 relative to the inner side of the host module 52, the driving mechanism 56 of the invention not only can provide smooth and stable operation but also can avoid abrasion by replacing sliding friction with rolling friction. Especially, if there are four protruding structures 64 disposed at four corners of the host module fixing component 60, the protruding structures 64 will still generate rolling friction even though the host module fixing component 60 does not move straight rather than generating larger friction by a conventional sliding structure. Therefore, the structure of the invention has several advantages of practicability, heavy duty, smooth operation and stability.

Figure 7:
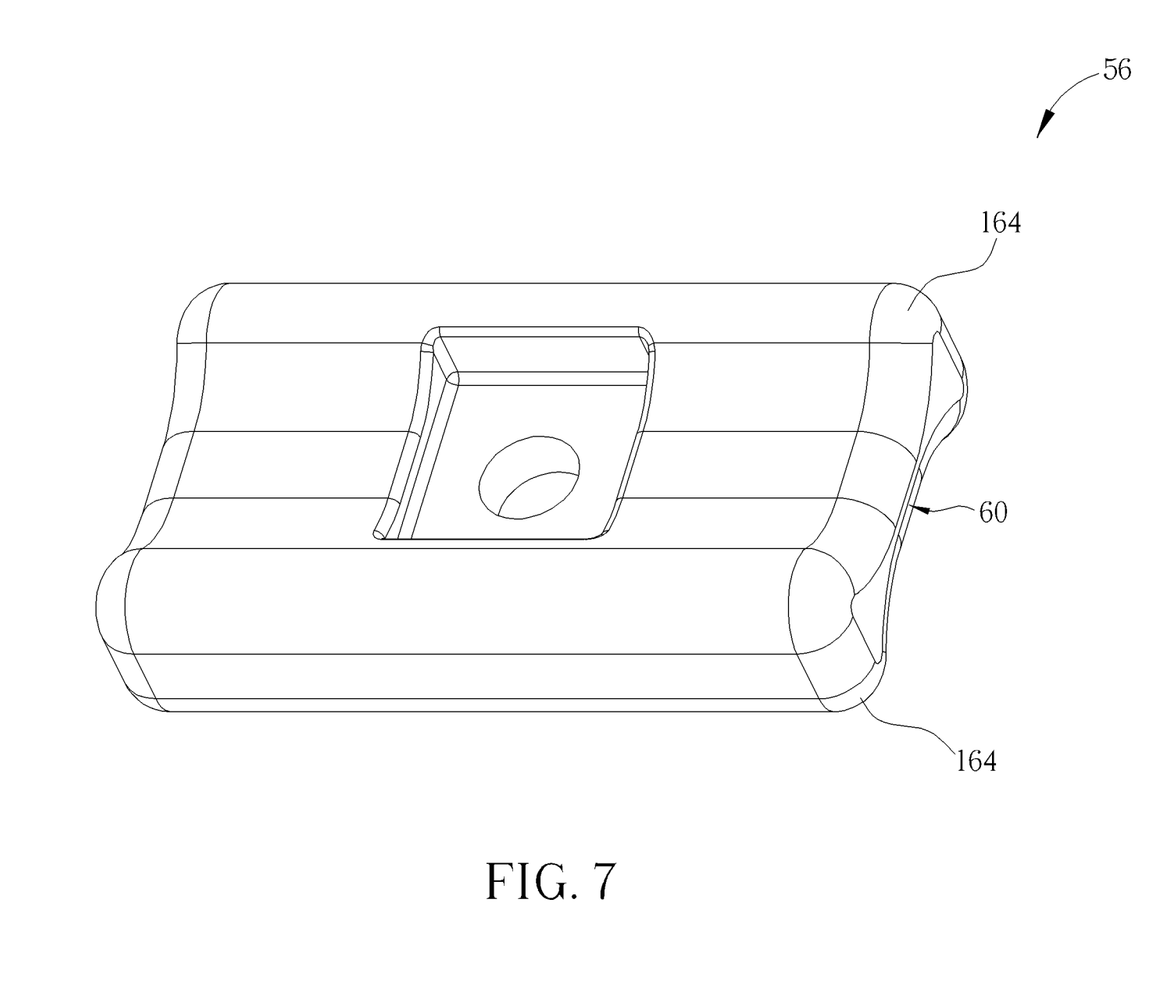
FIG. 7 is a perspective view illustrating the host module fixing component and two protruding structures according to another embodiment of the invention.
Figure 8:
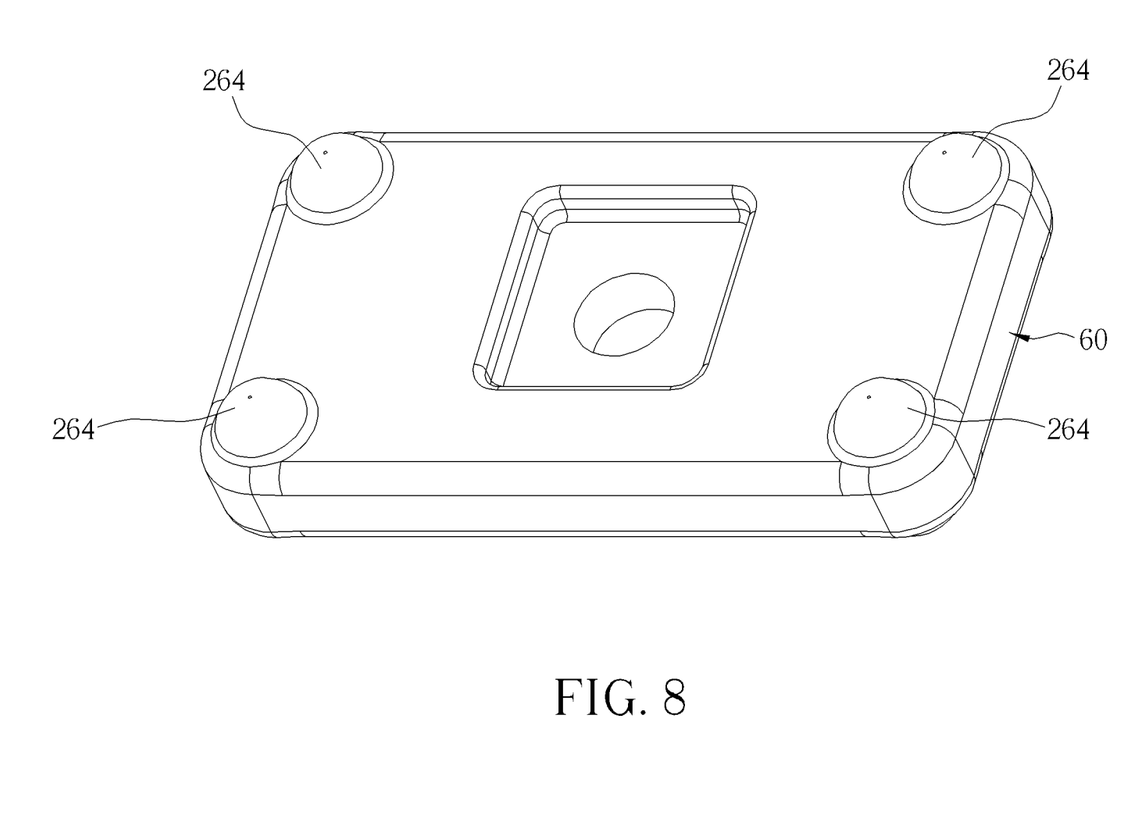
FIGS. 8 and 9 are perspective view and side view illustrating the host module fixing component and a plurality of protruding structures according to another embodiment of the invention.
Figure 9:
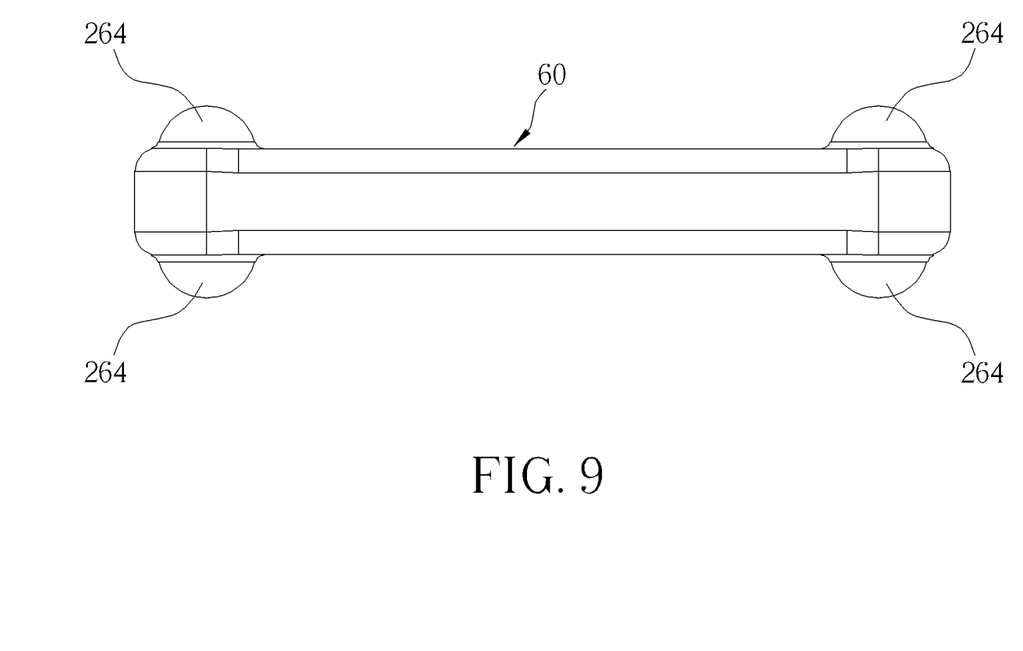

Still further, the protruding structure of the invention may be implemented by other structures. For example, referring to FIGS. 7 to 9, FIG. 7 is a perspective view illustrating the host module fixing component 60 and two protruding structures 164 according to another embodiment of the invention, and FIGS. 8 and 9 are perspective view and side view illustrating the host module fixing component 60 and a plurality of protruding structures 264 according to another embodiment of the invention. As shown in FIG. 7, each of the protruding structures 164 is a protruding bar, wherein the protruding bar and the host module fixing component 60 may be formed integrally. The protruding structure 164 is capable of moving relative to the inner side of the host module 52 in line contact manner. In this embodiment, the driving mechanism 56 comprises two protruding structures 164 disposed at opposite sides of the host module fixing component 60, so as to guide the host module fixing component 60 to move relative to the host module 52 stably. The position and number of the protruding structures 164 are not limited to the aforesaid embodiment and can be determined based on practical applications. As mentioned in the aforesaid embodiment, since the protruding structures 164 move relative to the inner side of the host module 52 in line contact manner, the driving mechanism 56 of the invention not only can provide smooth and stable operation but also can reduce resistance and abrasion during movement. Moreover, as shown in FIGS. 8 and 9, each of the protruding structures 264 is a protruding block, wherein the protruding block and the host module fixing component 60 may be formed integrally. The protruding structure 264 is capable of moving relative to the inner side of the host module 52 in point contact manner. In this embodiment, there are four protruding structures 264 disposed at an upper side of the host module fixing component 60 and there are another four protruding structures 264 disposed at a lower side of the host module fixing component 60, so as to guide the host module fixing component 60 to move relative to the host module 52 stably. The position and number of the protruding structures 264 are not limited to the aforesaid embodiment and can be determined based on practical applications. As mentioned in the aforesaid embodiment, since the protruding structures 264 move relative to the inner side of the host module 52 in point contact manner, the driving mechanism 56 of the invention not only can provide smooth and stable operation but also can reduce resistance and abrasion during movement.

Compared with the prior art, the protruding structure of the invention can move relative to the inner side of the host module in line contact manner or point contact manner, so as to guide the display module to slide relative to the host module. The driving mechanism of the invention not only can provide smooth and stable operation but also can avoid abrasion. Furthermore, the driving mechanism of the invention can avoid larger friction generated by the sliding structure of prior art. Accordingly, the structure of the invention has several advantages of practicability, heavy duty, smooth operation and stability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving mechanism for driving a display module to move relative to a host module, comprising:
    a display module fixing component disposed in the display module;
    a host module fixing component movably disposed in the host module;
    a pivoting component, an end of the pivoting component being pivotally connected to the display module fixing component and another end of the pivoting component being fixed to the host module fixing component, the pivoting component driving the host module fixing component to move linearly along a direction parallel to a bottom of the host module as the display module rotates with respect to the host module; and
    at least one protruding structure disposed on the host module fixing component and capable of moving relative to an inner side of the host module in line contact manner or point contact manner as the pivoting component drives the host module fixing component to move, so as to guide the host module fixing component to move relative to the host module.

2. The driving mechanism of claim 1, wherein the at least one protruding structure is a roller or a ball bearing capable of rolling relative to the inner side of the host module in line contact manner.

3. The driving mechanism of claim 1, wherein the at least one protruding structure is a protruding bar capable of moving relative to the inner side of the host module in line contact manner.

4. The driving mechanism of claim 1, wherein the at least one protruding structure is a protruding block capable of moving relative to the inner side of the host module in point contact manner.

5. The driving mechanism of claim 1, further comprising a fastening component passing through the host module fixing component and being fastened on the pivoting component, so as to fasten the host module fixing component to the pivoting component.

6. A portable electronic device comprising:
    a host module;
    a display module slidably disposed on a side of the host module; and
    a driving mechanism connected with the host module and the display module and used for driving the display module to slide and rotate relative to the host module, the driving mechanism comprising:
        a display module fixing component disposed in the display module;
        a host module fixing component movably disposed in the host module;
        a pivoting component, an end of the pivoting component being pivotally connected to the display module fixing component and another end of the pivoting component being fixed to the host module fixing component, the pivoting component driving the host module fixing component to move linearly along a direction parallel to a bottom of the host module as the display module rotates with respect to the host module; and at least one protruding structure disposed on the host module fixing component and capable of moving relative to an inner side of the host module in line contact manner or point contact manner as the pivoting component drives the host module fixing component to move, so as to guide the host module fixing component to move relative to the host module.

7. The portable electronic device of claim 6, wherein the at least one protruding structure is a roller or a ball bearing capable of rolling relative to the inner side of the host module in line contact manner.

8. The portable electronic device of claim 6, wherein the at least one protruding structure is a protruding bar capable of moving relative to the inner side of the host module in line contact manner.

9. The portable electronic device of claim 6, wherein the at least one protruding structure is a protruding block capable of moving relative to the inner side of the host module in point contact manner.

10. The portable electronic device of claim 6, wherein the driving mechanism further comprises a fastening component passing through the host module fixing component and being fastened on the pivoting component, so as to fasten the host module fixing component to the pivoting component.

11. The portable electronic device of claim 6, wherein a slot is formed on the host module and the pivoting component is movably disposed in the slot.

* * * * *